US008621020B2

(12) United States Patent
Glasser et al.

(10) Patent No.: US 8,621,020 B2
(45) Date of Patent: *Dec. 31, 2013

(54) METHOD AND APPARATUS FOR SELECTIVE E-MAIL PROCESSING

(75) Inventors: Alan L. Glasser, Manalapan, NJ (US);
John F. Lucas, Tinton Falls, NJ (US);
Steven W. Spear, Piscataway, NJ (US);
Laura Velez-Kohler, Holmdel, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/527,183

(22) Filed: Jun. 19, 2012

(65) Prior Publication Data

US 2012/0324580 A1 Dec. 20, 2012

Related U.S. Application Data

(63) Continuation of application No. 11/050,090, filed on Feb. 3, 2005, now Pat. No. 8,224,902.

(60) Provisional application No. 60/541,669, filed on Feb. 4, 2004.

(51) Int. Cl.
*G06F 15/16* (2006.01)
*G06F 9/00* (2006.01)

(52) U.S. Cl.
USPC .......................................... 709/206; 726/13

(58) Field of Classification Search
None
See application file for complete search history.

(56) References Cited

U.S. PATENT DOCUMENTS

| | | | |
|---|---|---|---|
| 5,619,648 A | 4/1997 | Canale et al. | |
| 5,999,967 A | 12/1999 | Sundsted | |
| 6,199,102 B1 | 3/2001 | Cobb | |
| 6,321,267 B1 | 11/2001 | Donaldson | |
| 6,654,787 B1 | 11/2003 | Aronson et al. | |
| 6,772,196 B1 | 8/2004 | Kirsch et al. | |
| 6,832,245 B1 | 12/2004 | Isaacs et al. | |
| 7,181,498 B2 | 2/2007 | Zhu et al. | |
| 7,272,378 B2 | 9/2007 | Petry et al. | |
| 7,277,695 B2 | 10/2007 | Petry et al. | |
| 7,310,816 B1 | 12/2007 | Burns et al. | |
| 7,321,922 B2 | 1/2008 | Zheng et al. | |
| 7,359,948 B2 | 4/2008 | Ralston et al. | |
| 7,460,496 B2 * | 12/2008 | Miloslavsky et al. | 370/270 |
| 7,490,131 B2 * | 2/2009 | Maller | 709/206 |
| 7,533,148 B2 * | 5/2009 | McMillan et al. | 709/206 |
| 7,694,128 B2 * | 4/2010 | Judge et al. | 713/152 |
| 2001/0032245 A1 * | 10/2001 | Fodor | 709/206 |
| 2002/0007453 A1 | 1/2002 | Nemovicher | |
| 2003/0229672 A1 | 12/2003 | Kohn | |
| 2004/0196968 A1 | 10/2004 | Yue | |
| 2005/0027879 A1 * | 2/2005 | Karp | 709/238 |

* cited by examiner

*Primary Examiner* — Mohamed Ibrahim
*Assistant Examiner* — Thomas Richardson
(74) *Attorney, Agent, or Firm* — Wolff & Samson, PC

(57) ABSTRACT

Disclosed is a system and method for selective email processing. A traffic separator includes an interface for receiving electronic mail traffic from a source network address. The traffic separator also includes a processor for comparing the source network address to a stored list of network addresses to determine a categorization of the network source address. The traffic separator also includes at least one interface for forwarding the electronic mail traffic to one of many message transfer agents (MTAs) based upon said determination. A database stores the list of network addresses. In one embodiment, one or more network addresses in the stored list are network address ranges.

18 Claims, 6 Drawing Sheets

200

|  | SOURCE IP ADDRESS | LEVEL OF TRUST | MTA IDENTIFIER |
|---|---|---|---|
| 208 | 192.200.3.5 | 1 | 1 |
| 210 | 205.XXX.X.X | 2 | 2 |
| 212 | 63.128.200.18 | 5 | N |
| 214 | ANY OTHER | 3 | 3 |

202  204  206

RECEIVE EMAIL TRAFFIC — 302

COMPARE SOURCE NETWORK ADDRESS WITH LIST OF NETWORK ADDRESSES — 304

FORWARD EMAIL TRAFFIC TO MTA BASED ON LOOKUP — 306

END

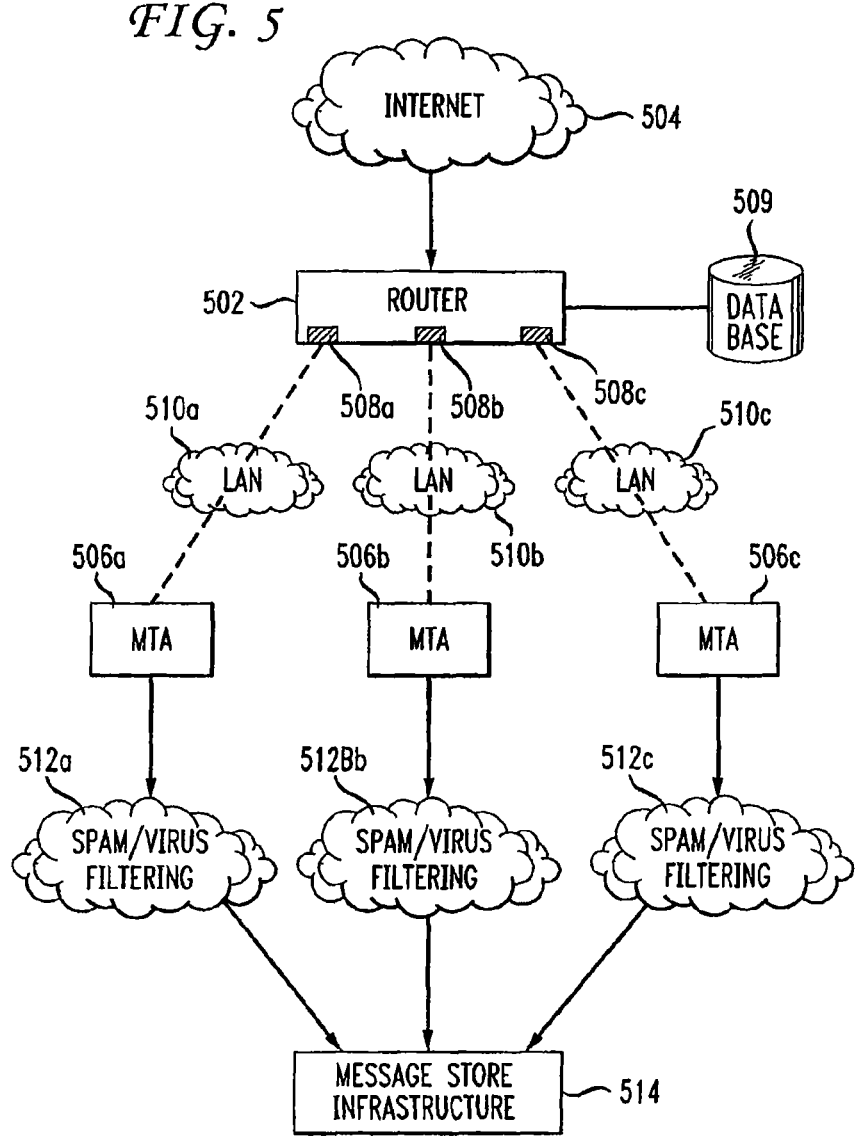

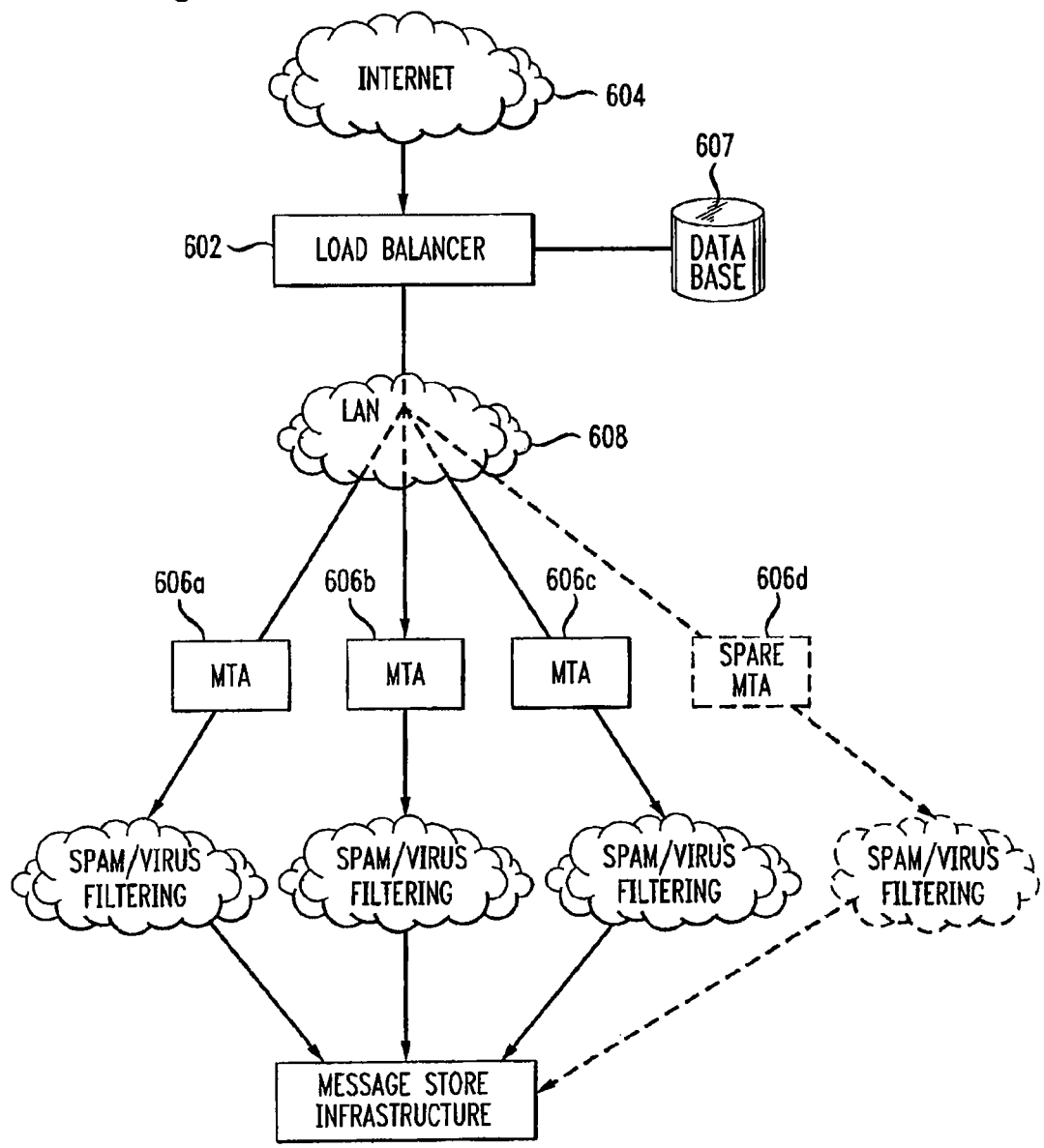

FIG. 7A
700

| SOURCE IP ADDRESS | LEVEL OF TRUST | ROUTER OUTPUT PORT |
|---|---|---|
| 192.200.3.5 | 1 | PORT 1 |
| 197.XXX.X.X | 2 | PORT 2 |
| 63.128.200.18 | 3 | PORT 3 |
| ANY OTHER | 4 | PORT 4 |

706 — 192.200.3.5
708 — 197.XXX.X.X
710 — 63.128.200.18
711 — ANY OTHER 702  703  704

FIG. 7B
712

| SOURCE IP ADDRESS | LEVEL OF TRUST | MAC ADDRESS |
|---|---|---|
| 205.XXX.X.X | 1 | 006097981E6B, 00609912FEB3, 00606621432B |
| 143.89.1.1 | 2 | 04508712C1B8 |
| ANY OTHER | 3 | 45012732814 |

720 — 205.XXX.X.X
722 — 143.89.1.1
724 — ANY OTHER 714  716  718

METHOD AND APPARATUS FOR SELECTIVE E-MAIL PROCESSING

This application is a continuation of U.S. patent application Ser. No. 11/050,090, filed Feb. 3, 2005, which claims the benefit of U.S. Provisional Application No. 60/541,669, filed Feb. 4, 2004, both of which is are entirely incorporated herein by reference.

BACKGROUND OF THE INVENTION

The present invention relates generally to electronic mail, and more particularly to reducing unwanted email by reducing the resources devoted to processing the unwanted email.

As the popularity of the Internet has increased drastically over the past few decades, communication via email has often become a large part of people's daily lives.

Unsolicited commercial email, also known as spam, has grown dramatically and has had a significant detrimental impact on computer users and networks. Spam wastes tangible resources relied upon by Internet service providers (ISPs) such as bandwidth, ISP disk space, user email storage space, networking and computer resources, etc. In some instances, spam can bring down servers.

One solution to the spam problem is the use of filtering techniques on a per message basis. Spam filters attempt to intercept spam before it reaches an end user's electronic mailbox. These filters can operate at an ISP or corporate email server (or locally, on an end user's computer) in order to filter the email before an end user sees the email. Spam filters generally use some form of syntactic or semantic filtering. For example, some filters may have a database of keywords which, if present in an email message, results in the email message being identified as spam. More sophisticated filters use rules that are heuristics used to assign a score to the mail message to be examined, with the score indicating the likelihood of the message being spam. Once a message is identified as spam, it may be deleted, stored in a separate mailbox associated with likely spam messages, or otherwise segregated.

While filtering can be effective in decreasing the amount of spam sent to an end user, the reduction in spam is often expensive. The ISP or enterprise mail system has to devote resources to process all incoming messages, including spam. In order to handle the immense and growing volume of email, ISPs and email providers typically have to continually maintain, upgrade, and purchase improved, more powerful and greater numbers of computers and networking resources.

A deficiency of current solutions to spam is that email sent from a source has to obtain a connection at the receiving ISP system before the receiving ISP system can identify email as spam. In particular, Message Transfer Agents (MTAs) typically handle the details of sending and receiving email across a network such as the Internet. By convention, the sending MTA (e.g., Unix sendmail or Microsoft Exchange) establishes a connection to the destination MTA. Once the connection is established, email is transferred across the Internet. Thus, existing ISP systems have to receive and process legitimate email as well as spam with a limited amount of resources having a limited number of connections. Because of the enormous volume of email, the limited number of connections available on an ISP's MTAs and, similarly, the limited amount of resources to handle the enormous volume, often result in a bottleneck to email transferring and processing. Specifically, legitimate email competes with spam for the valuable connections and processing resources, and, as a result, can be delayed.

Another solution to the spam problem occurs at the network source level. A "whitelist", or list of email sources that are known not to deliver large amounts of spam (i.e., "trusted" sources) is created. If email is received at a router from a network source that is not on a whitelist, then email from that source is blocked at the router. The problem is that this can exclude legitimate email that happens not to pass through one of the trusted sources.

Thus, spam represents a drain on the efficiency and profitability of ISPs and email providers alike.

BRIEF SUMMARY OF THE INVENTION

The present invention provides for an improved method and apparatus for processing electronic mail. In accordance with the invention, a traffic separator receives electronic mail traffic from a source network address. The traffic separator compares the source network address to a stored list of network addresses to determine a categorization of the network source address. The traffic separator forwards the electronic mail traffic to one of a plurality of message transfer agents (MTAs) based upon the determination.

In accordance with one embodiment of the invention, the categorization of the network source address includes determining a level of trust associated with the network source address. Each MTA (or group of MTAs) is associated with a different level of trust. The database stores a list of network addresses associating sources with different levels of trust. There may be any number of levels of trust. By associating network source addresses and MTAs with a level of trust, email from an untrusted source is directed to a particular MTA. Further, an ISP may provide a greater number of and better resources to the MTAs associated with trusted sources. Thus, the resources available in an ISP's system and, similarly, the available connections on those resources (i.e., MTAs), are more readily available to receive and process email transmitted from more trusted sources.

The traffic separator may be a router. In another embodiment, the traffic separator may be implemented as a load balancer.

Further processing of the electronic mail traffic may also be performed after the electronic mail traffic is forwarded to an MTA. This processing may include spam and/or virus filtering. The amount of additional processing performed may vary depending on the level of trust associated with the MTA. The electronic mail traffic can then be forwarded to a message store infrastructure.

These and other advantages of the invention will be apparent to those of ordinary skill in the art by reference to the following detailed description and the accompanying drawings.

BRIEF DESCRIPTION OF THE DRAWINGS

FIG. 5 shows an inbound electronic mail architecture in which a router embodiment of the invention may be implemented;

FIG. 6 shows an inbound electronic mail architecture in which a load balancer embodiment of the invention may be implemented;

FIG. 7A shows a data structure which may be used to store a list of network addresses and associated router output ports in a database; and FIG. 7B shows a data structure which may be used to store a list of network addresses and associated Ethernet addresses in a database.

DETAILED DESCRIPTION

Figure 1:
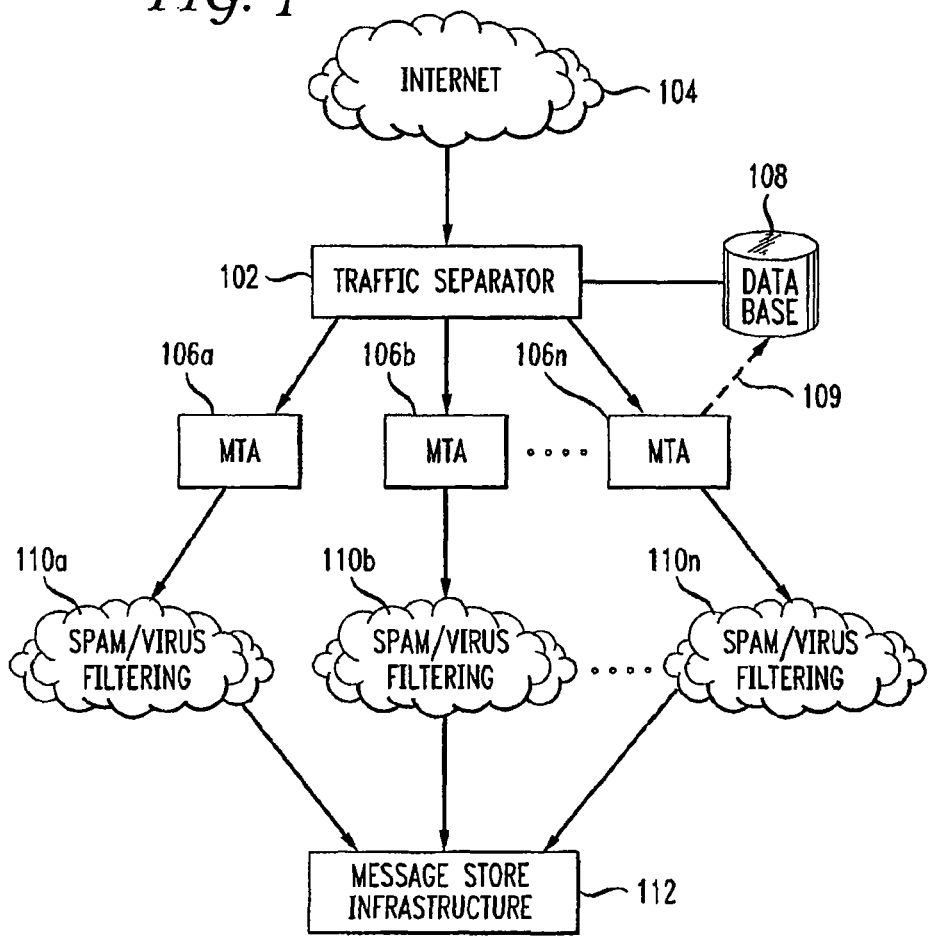
FIG. 1 shows a high level block diagram of an inbound electronic mail architecture in accordance with an embodiment of the invention.

FIG. 1 shows a high level block diagram of an ISP's inbound electronic mail (i.e., email) architecture in accordance with the principles of the present invention. Further details regarding particular embodiments of the invention will be described in further detail in connection with FIGS. 2-7B. FIG. 1 shows a traffic separator 102 receiving email traffic from the Internet 104. In the past, all email received from the Internet 104 competes for the limited resources and the limited number of connections of the ISP's resources. In particular, all email (i.e., legitimate email and spam) competes for a connection on the ISP's MTAs (e.g., MTA 106a, 106b, ... 106n (generally 106)). Thus, in order for the ISP to identify and prevent spam from being sent to the end user, spam and legitimate email have to obtain a connection on one of the MTAs for processing. Once the connection is obtained, the email is then processed, thereby potentially enabling the MTA's identification of and filtering of spam. Due to the large volume of email, an ISP may have to devote a large number of MTAs (e.g., thirty to forty MTAs) to receive and process all of the email traffic (i.e., legitimate email and spam) where a large percentage of the total traffic is spam.

In accordance with the principles of the present invention, the traffic separator 102 operates at the network or link level to selectively direct incoming email traffic to one of the MTAs 106. The MTAs 106 are any machine or device that handles the details of sending and receiving email across a network such as the Internet 104. The MTAs 106 may be individual computers or may be clusters configured for high volumes and/or high availability. In one embodiment, multiple MTAs 106 execute on a single computer. As shown, the email architecture of FIG. 1 may have any number of MTAs communicating with the traffic separator 102. The traffic separator 102 determines which MTA 106 to forward a received email message to depending on a list of network addresses stored by database 108. The database 108 may store one list or multiple lists of network addresses. It is noted that database 108 is shown as an external component connected to traffic separator 102. However, in various alternative embodiments, the database 108 may be internal to traffic separator 102 (e.g., stored in internal memory or storage), may be an externally connected device such as shown, or may be a stand-alone network node which the traffic separator 102 accesses via a network interface.

Each MTA 106 (or group of MTAs) is associated with a different level of trust. The database 108 stores a list of network addresses associating sources with different levels of trust. There may be any number of levels of trust. For example, there may be a "trusted" level, a "somewhat trusted" level, an "unknown" level, a "somewhat untrusted" level, and an "untrusted" level. In particular, trusted sources are sources that are known in advance to not typically transmit spam. If a network source address does not appear in the list of network addresses in the database 108, the level of trust is "unknown". A network source address is classified as untrusted if spam is typically received from the network source address.

For example, the first MTA 106 may be configured to meet committed performance levels of the ISP and, therefore, may be associated with the highest level of trust. Thus, if the traffic separator 102 determines that email traffic has a source network address that is trusted, the traffic separator 102 directs the email traffic to the first MTA 106a. In one embodiment the second MTA 106b may be engineered to lower performance levels relative to the first MTA 106a. Thus, if the traffic separator 102 determines that email traffic has a source network address that is somewhat trusted, the traffic separator 102 directs the email traffic to the second MTA 106b. Further, an ISP may devote lower amounts of and less powerful resources to receive and process spam. To prevent spam from monopolizing connections on multiple MTAs 106, a single MTA (e.g., MTA 106n) may be designated as the MTA for email traffic received from an untrusted network source. By associating one or more levels of trust to each MTA 106 (or group of MTAs) and email sources, much less competition arises between spam and legitimate email for valuable MTA connections. Specifically, because the traffic separator 102 selectively directs email traffic to particular MTAs 106 based on the level of trust associated with the source of the email traffic, the email traffic is not all competing for the same MTA connections.

Although particular trust levels are described with respect to particular MTAs 106 (e.g., the trusted email traffic is sent to the first MTA 106a), the traffic separator 102 can direct the email traffic associated with a particular trust level to a group of MTAs 106.

In further embodiments, one or more MTAs 106 are designated as spare MTAs. The spare MTA can be employed if an active MTA 106 fails. In one embodiment, the traffic separator 102 detects a failure of an MTA 106 and automatically transmits packets to the spare MTA in place of the failed MTA 106.

After the MTA 106 receives the email traffic, additional processing on the email may be performed. This additional processing may be performed by a corresponding spam/virus filtering function 110a, 110b, 110n (generally 110). The spam/virus filtering function 110 can be implemented in a number of ways, such as with a function call by the MTA 106 or via a software program executing on an independent machine or device. In accordance with an advantage of the invention, the spam/virus filtering function 110 may perform a different amount of processing (e.g., filtering) for messages arriving from the various MTAs 106. Thus, because the traffic separator 102 only transmits email traffic from trusted sources to the first MTA 106a, the amount of additional processing (e.g., filtering) performed on these emails may be minimal. Thus, the corresponding first spam/virus filtering function 110a may perform minimal filtering. In some embodiments, the email traffic from the first MTA 106 is transmitted directly to the message store infrastructure 112 (e.g., without further processing). The message store infrastructure 112 may be, for example, one or more email servers. Further, the corresponding second spam/virus filtering function 110 may perform more aggressive filtering for email traffic received from the second MTA 106b because the email traffic is from a source that is somewhat trusted rather than trusted. Once this additional processing is completed, the email traffic is sent to the message store infrastructure 112.

Figures 2, 3:
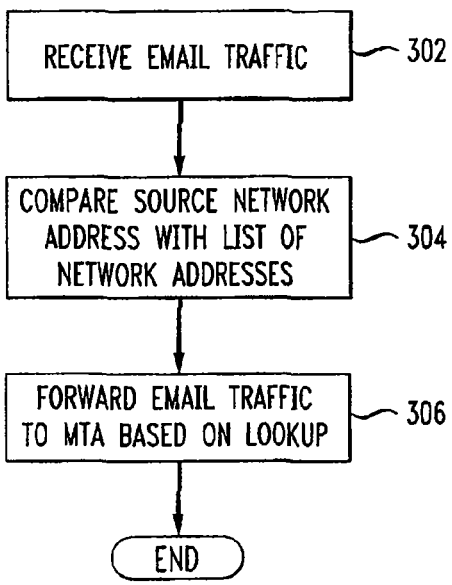
FIG. 2 shows a data structure which may be used to store a list of network addresses and associated MTA identifiers in a database.
FIG. 3 is a flowchart showing the steps performed by a traffic separator in accordance with an embodiment of the invention.

FIG. 2 shows one embodiment of a data structure which may be stored in database 108. In accordance with one embodiment of the invention, database 108 contains a relational database 200 containing multiple records, with each record comprising multiple fields. Field 202 identifies the source IP address. This identification may be an IP address, a range of IP addresses, or subnetwork addresses that cover a number of individual addresses. Field 204 identifies a level of trust associated with the source IP address. The level of trust may be designated with a flag (e.g., trusted, somewhat trusted, unknown, somewhat untrusted, untrusted) or may be designated with a number (e.g., a 1 corresponds to the trusted level, a 2 corresponds to the somewhat trusted level, etc.). Field 206 identifies the MTA 106 associated with the level of trust. Thus, field 206 identifies which MTA 106 the traffic separator 102 directs email traffic to depending on the level of trust associated with the source IP address of the email traffic.

Records 208-214 show exemplary records which may be stored in database 108. Record 208 indicates that the source IP address is 192.200.3.5 and this source network address consistently does not deliver spam. Thus, this source network address is assigned a level of trust of 1. The traffic separator 102 directs email traffic from the source IP address of 192.200.3.5 to the first MTA 106a. Record 210 indicates a range of IP addresses that fall into a second level of trust. Thus, any IP address that begins with 205 will be routed to the second MTA 106b. Similarly, if the traffic separator 102 receives email traffic from a source IP address of 63.128.200.18, the traffic separator 102 determines that this network source has a level 5 trust rating (i.e., untrusted) and transmits the email traffic to the last MTA 106n. Finally, as shown in record 214, if the traffic separator 102 receives email traffic from an unknown source IP address, the traffic separator 102 determines that this network source has a level 3 trust level (i.e., unknown) and transmits the email traffic to a third MTA 106c (not shown).

The database records may be populated in various ways. In one embodiment, the database records are populated manually. For example, an administrator can manually update the database 108 by listing trusted sources (as determined from past email traffic). In some embodiments, the lists are text files that are updated via a text editor. Alternatively, a user may update the lists using a graphical user interface (GUI). The lists may be relatively static, rarely needing updating or may be dynamic, requiring updating often (e.g., in near real time). In some embodiments, the lists are updated automatically (e.g., via the Mail Abuse Prevention System (MAPS) Realtime Blackhole List (RBL)). The RBL is a list that is frequently updated with IP addresses of spam sources.

In yet another embodiment, the lists are updated adaptively. In this embodiment, the MTAs 106 use heuristics to determine a network source's classification (e.g., unknown, trusted, etc.). The heuristics may require email messages delivered (from a particular network source) over the same MTA connection to have less than a threshold percentage of unknown recipients before classifying the email source as a trusted source. For example, if more than 10% of the recipients of email messages received from a particular source network address are unknown, then the source of the email message may be classified as "somewhat untrusted". This information may also be fed back from the MTA 106 to the database 108. An example of the feedback from MTA 106n is shown with feedback arrow 109. The heuristics may also warrant a classification change back to the unknown level if the heuristics determine that the same email source is sending email traffic having less than 10% of its recipients as unknown recipients. Further, if the traffic separator 102 repeatedly receives email traffic having no unknown recipients from the same IP source, the MTA 106 may then update the database 108 to classify this source as a somewhat trusted source. Other heuristics rules may be applied.

An embodiment of the steps performed by the traffic separator 102 of FIG. 1 will now be described in further detail in connection with the flowchart of FIG. 3. The traffic separator 102 receives email traffic from the Internet 104, as shown in step 302. The traffic separator 102 determines the network source address of the email traffic. In one embodiment, the traffic separator 102 makes this determination by inspecting the IP header of the email packet. The traffic separator 102 then compares the source network address of the email traffic with a stored list of source network addresses in step 304 to associate packets with a level of trust. The traffic separator 102 then forwards the email traffic to the corresponding MTA 106 based on the database lookup, as shown in step 306. If the traffic separator 102 determines that the source network address of the email traffic is not on any list in step 304, the traffic separator 102 considers the source network address as unknown and transmits the email traffic to a MTA 106 designated to receive and process email traffic from an unknown source.

Thus, the traffic separator 102 selectively directs email traffic to particular MTAs 106 depending on a comparison of the network source address of the email traffic and a list of stored network source addresses.

Figure 4:
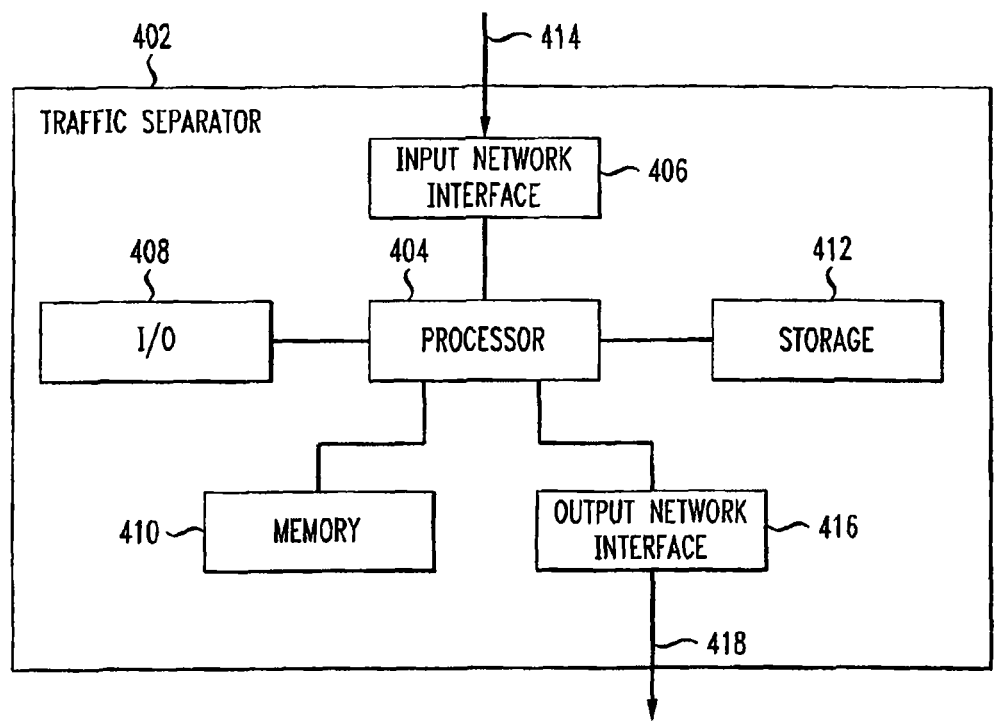
FIG. 4 shows a high level block diagram of a traffic separator which may be used in an embodiment of the invention.

A high level block diagram of a computer implementation of the traffic separator 402 is shown in FIG. 4. Traffic separator 402 contains a processor 404 which controls the overall operation of the computer by executing computer program instructions which define such operation. The computer program instructions may be stored in a storage device 412 (e.g., magnetic disk, database 108) and loaded into memory 410 when, execution of the computer program instructions is desired. Thus, the traffic separator operation will be defined by computer program instructions stored in memory 410 and/or storage 412 and the computer will be controlled by processor 404 executing the computer program instructions. Computer 402 also includes one or more input network interfaces 406 for communicating with other devices via a network (e.g., the Internet) and for receiving the email traffic 414. Computer 402 also includes one or more output network interfaces 416 for communicating with other devices and for transmitting email traffic 418 to other devices. Traffic separator 402 also includes input/output 408 which represents devices which allow for user interaction with the computer 402 (e.g., display, keyboard, mouse, speakers, buttons, etc.). One skilled in the art will recognize that an implementation of an actual computer will contain other components as well, and that FIG. 4 is a high level representation of some of the components of such a computer for illustrative purposes.

FIG. 5 shows the email architecture in which a router embodiment of the invention may be implemented. In one embodiment, the traffic separator is a router 502. The router 502 receives packets from the Internet 504 directed to the IP network address(es) of the MTAs (e.g., MTA 506a, 506b, 506c (generally MTA 506)). In one embodiment, the router 502 employs source address based routing. The router 502 has ports 508a, 508b, 508c (generally 508) corresponding with the respective MTA 506a, 506b, 506c. The router 502 communicates with database 509 to determine which port 508 to use to transmit the email traffic. The router 502 (i.e., each port 508 of the router 502) connects to distinct local area network (LAN) segments 510a, 510b, 510c (generally 510). Each LAN segment 510 enables communication between the router 502 and a corresponding MTA 506. Thus, to communicate with the first MTA 506a, the router 502 communicates over the first LAN segment 510a. Each MTA 506a, 506b, 506c communicates with a corresponding spam/virus filtering function 512a, 512b, 512c (generally 512). Although shown with three MTAs 506, a router with three ports 508, three LAN segments 510, and three spam/virus filtering functions 512, any number of each may be present according to the principles of the invention.

In one embodiment, the traffic separator 502 may be a computer executing the Linux operating system. The Linux kernel provides the routing function. The list of IP addresses is stored as a list of kernel routing rules.

FIG. 6 shows the email architecture in which a load balancer embodiment of the invention may be implemented. The load balancer 602 has the IP address of the ISP's incoming MTA system. The load balancer 602 receives email traffic from the Internet 604. The load balancer 602 and the MTAs 606a, 606b, 606c (generally 606) reside on the same Ethernet LAN segment 608. The load balancer 602 and the MTAs all have the MTA IP address.

Generally, IP networks maintain a mapping between the IP address of a device and its Media Access Control (MAC) address. This mapping is referred to as the Address Resolution Protocol (ARP) table. In accordance with the principles of the present invention, the load balancer 602 responds to the ARP requests associated with the IP address of the MTAs 606. The MTAs 606 do not respond to the ARP requests. Thus, the load balancer 602 receives all packets destined for the MTA IP address. When an incoming packet arrives, the load balancer 602 performs a database lookup of the stored lists of network source addresses in database 607. Each list is associated with an MTA 606 (or group of MTAs 606). If a packet's source address is found on one of the stored lists, the load balancer 602 transmits the packet on the Ethernet LAN 608 using the MAC address of the corresponding MTA 606. If the load balancer 602 determines that the packet is not on a stored list, the load balancer 602 transmits the packet over the Ethernet LAN 608 using the MAC address of the MTA 606 (e.g., MTA 606c) designated to handle email traffic from sources not on a list.

In further embodiments, one or more MTAs 606 (e.g., a fourth MTA 606d) are designated as spare MTAs. The spare MTA 606d can be employed if an active MTA 606 fails. In one embodiment, the load balancer 602 detects a failure of an MTA 606 and automatically transmits packets to the spare MTA 606d in place of the failed MTA 606.

In one embodiment, the architecture is implemented on a computer executing the Linux operating system. The load balancer 602 uses the "firewall mark" feature of the Linux kernel's IP packet filtering subsystem to mark packets based on their source IP addresses. The kernel's IP virtual server subsystem is used to transmit packets to the appropriate MTA system by rewriting the destination MAC address based on the packet marking.

FIG. 7A shows one embodiment of a data structure which may be stored in database 509. The data structure shown in FIG. 7A relates to the router embodiment described above in FIG. 5. In accordance with the embodiment of FIG. 7A, database 509 contains a relational database 700 containing multiple records, with each record comprising multiple fields. Field 702 identifies the source IP address. Field 703 identifies a level of trust associated with the source IP address. Field 704 identifies the router output port that the router 502 directs email traffic to depending on the level of trust associated with the source IP address.

Records 706-711 show exemplary records which may be stored in database 509. Record 706 indicates that the source IP address is 192.200.3.5 and this source network address consistently does not deliver spam. Thus, this source network address is assigned a level of trust of 1. The router 502 directs email traffic from the source IP address of 192.200.3.5 to router output port 1 and, consequently, to the first MTA 506a.

Record 708 indicates a range of IP addresses that fall into a second level of trust. Thus, any IP address that begins with 197 will be routed to the output port 2 of the router 502. Output port 2 communicates with the second MTA 506b. Similarly, if the router 502 receives email traffic from a source IP address of 63.128.200.18, the router 502 determines that this network source has a level 3 trust rating and transmits the email traffic to the third MTA 506c (as shown in record 710). Furthermore, if the router 502 receives email traffic from any other source IP address, the router 502 determines that the network source address is not on a list and is therefore unknown. The router 502 transmits the unknown email traffic to, for instance, a router output port 4 and, consequently, to a fourth MTA (shown in record 711).

FIG. 7B shows one embodiment of a data structure which may be stored in database 607. The data structure shown in FIG. 7B relates to the load balancer embodiment described above in FIG. 6. In accordance with the embodiment of FIG. 7B, database 607 contains a relational database 712 containing multiple records, with each record comprising multiple fields. As described above, field 714 identifies the source IP address. Field 716 identifies the level of trust associated with the source IP address. Field 718 identifies the list of Ethernet MAC addresses that the load balancer 602 directs email traffic to depending on the level of trust associated with the source IP address.

Record 720 indicates a range of IP addresses that fall into the first level of trust. Thus, any emails having a source IP address that begins with 205 will be transmitted to the MTAs having the listed MAC addresses. Similarly, if the load balancer 602 receives email traffic having an IP address of 143.89.1.1, the load balancer 602 transmits the email traffic to the MTA having a MAC Address of 04508712C1B8 (as shown in record 722). Further, if the load balancer 602 receives email traffic from any other source IP address, the load balancer 602 determines that the network source address is not on a list and is therefore unknown. The load balancer 602 transmits the unknown email traffic to, for instance, an MTA having a MAC address of 45012732814 (shown in record 724).

In one embodiment, the MTA associated with untrusted sources has a small number of TCP connections available for email. Thus, if a large volume of email traffic is waiting for a limited number of connections, one or more sending email systems may time out because the sending email systems have not received a connection before a predetermined amount of time has elapsed. This timeout may discourage spammers from sending spam to the ISP. Moreover, the email traffic from the untrusted source is only occupying one MTA rather than tying down multiple MTAs.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for routing electronic mail to a plurality of message transfer agents, each message transfer agent having a respective amount of resources that configures a message transfer agent to a performance level associated with a level of trust, the method comprising:
  receiving electronic mail traffic from a network source address;
  comparing the network source address to a stored list of network addresses;
  in response to determining that the network source address appears in the stored list of network addresses:
    determining a level of trust associated with the network source address;
    selecting a first message transfer agent of the plurality of message transfer agents based on the level of trust, each of the plurality of message transfer agents having a respective amount of resources that configures each message transfer agent to a performance level associated with a respective level of trust, and
    routing the electronic mail traffic to the first message transfer agent; and
  in response to determining that the network source address does not appear in the stored list of network addresses:
    assigning a particular level of trust to the network source address based on the electronic mail traffic and a threshold and a percentage of unknown recipients associated with previous traffic from the network source address;
    selecting a second message transfer agent of the plurality of message transfer agents based on the particular level of trust; and
    routing the electronic mail traffic to the second message transfer agent.

2. The method of claim 1, further comprising:
  if the network source address does not appear in the stored list of network addresses, performing virus filtering on the electronic mail traffic.

3. The method of claim 1, wherein the electronic mail traffic is received from a sending email system, the method further comprising:
  if the network source address does not appear in the stored list of network addresses, timing out a connection with the sending email system.

4. The method of claim 1, wherein the first message transfer agent is associated with more resources than the second message transfer agent.

5. The method of claim 1, wherein the resources comprise transmission control protocol connections.

6. The method of claim 1, wherein the stored list of network addresses is updated adaptively based on feedback from a message transfer agent of the plurality of message transfer agents.

7. An apparatus for routing electronic mail to a plurality of message transfer agents, each message transfer agent having a respective amount of resources that configures a message transfer agent to a performance level associated with a level of trust, the apparatus comprising:
  a processor; and
  a memory to store computer program instructions, the computer program instructions when executed on the processor cause the processor to perform operations comprising:
    receiving electronic mail traffic from a network source address;
    comparing the network source address to a stored list of network addresses;
    in response to determining that the network source address appears in the stored list of network addresses:
      determining a level of trust associated with the network source address;
      selecting a first message transfer agent of the plurality of message transfer agents based on the level of trust, each of the plurality of message transfer agents having a respective amount of resources that configures each message transfer agent to a performance level associated with a respective level of trust, and
      routing the electronic mail traffic to the first message transfer agent; and
    in response to determining that the network source address does not appear in the stored list of network addresses:
      assigning a particular level of trust to the network source address based on the electronic mail traffic and a threshold and a percentage of unknown recipients associated with previous traffic from the network source address;
      selecting a second message transfer agent of the plurality of message transfer agents based on the particular level of trust; and
      routing the electronic mail traffic to the second message transfer agent.

8. The apparatus of claim 7, the operations further comprising:
  if the network source address does not appear in the stored list of network addresses, performing virus filtering on the electronic mail traffic.

9. The apparatus of claim 7, wherein the electronic mail traffic is received from a sending email system, the operations further comprising:
  if the network source address does not appear in the stored list of network addresses, timing out a connection with the sending email system.

10. The apparatus of claim 7, wherein the first message transfer agent is associated with more resources than the second message transfer agent.

11. The apparatus of claim 7, wherein the resources comprise transmission control protocol connections.

12. The apparatus of claim 7, wherein the stored list of network addresses is updated adaptively based on feedback from a message transfer agent of the plurality of message transfer agents.

13. A non-transitory computer readable medium storing computer program instructions for routing electronic mail to a plurality of message transfer agents, each message transfer agent having a respective amount of resources that configures a message transfer agent to a performance level associated with a level of trust, which, when executed on a processor, cause the processor to perform operations comprising:
  receiving electronic mail traffic from a network source address;
  comparing the network source address to a stored list of network addresses;
  in response to determining that the network source address appears in the stored list of network addresses:
    determining a level of trust associated with the network source address;
    selecting a first message transfer agent of the plurality of message transfer agents based on the level of trust, each of the plurality of message transfer agents having a respective amount of resources that configures each message transfer agent to a performance level associated with a respective level of trust, and routing the electronic mail traffic to the first message transfer agent; and in response to determining that the network source address does not appear in the stored list of network addresses:

assigning a particular level of trust to the network source address based on the electronic mail traffic and a threshold and a percentage of unknown recipients associated with previous traffic from the network source address;

selecting a second message transfer agent of the plurality of message transfer agents based on the particular level of trust; and routing the electronic mail traffic to the second message transfer agent.

14. The non-transitory computer readable medium of claim 13, the operations further comprising:

if the network source address does not appear in the stored list of network addresses, performing virus filtering on the electronic mail traffic.

15. The non-transitory computer readable medium of 13, wherein the electronic mail traffic is received from a sending email system, the operations further comprising:

if the network source address does not appear in the stored list of network addresses, timing out a connection with the sending email system.

16. The non-transitory computer readable medium of claim 13, wherein the first message transfer agent is associated with more resources than the second message transfer agent.

17. The non-transitory computer readable medium of claim 13, wherein the resources comprise transmission control protocol connections.

18. The non-transitory computer readable medium of 13, wherein the stored list of network addresses is updated adaptively based on feedback from a message transfer agent of the plurality of message transfer agents.

* * * * *

UNITED STATES PATENT AND TRADEMARK OFFICE
CERTIFICATE OF CORRECTION

| | | |
|---|---|---|
| PATENT NO. | : 8,621,020 B2 | Page 1 of 1 |
| APPLICATION NO. | : 13/527183 | |
| DATED | : December 31, 2013 | |
| INVENTOR(S) | : Alan L. Glasser et al. | |

It is certified that error appears in the above-identified patent and that said Letters Patent is hereby corrected as shown below:

In the Claims:

In Claim 15, column 12, line 4, "computer readable medium of 13" should read --computer readable medium of claim 13;--.

In Claim 18, column 12, line 15, "computer readable medium of 13" should read --computer readable medium of claim 13;--.

Signed and Sealed this
Sixth Day of May, 2014

Michelle K. Lee
*Deputy Director of the United States Patent and Trademark Office*